Patented Apr. 10, 1923.

1,451,456

UNITED STATES PATENT OFFICE.

MACDONALD C. BOOZE, OF WORCESTER, MASSACHUSETTS, ASSIGNOR TO NORTON COMPANY, OF WORCESTER, MASSACHUSETTS, A CORPORATION OF MASSACHUSETTS.

NONSLIP QUARTZ TILE.

No Drawing. Application filed November 11, 1920. Serial No. 423,456.

*To all whom it may concern:*

Be it known that I, MACDONALD C. BOOZE, a citizen of the United States of America, residing at Worcester, in the county of Worcester and State of Massachusetts, have invented certain new and useful Improvements in Nonslip Quartz Tiles, of which the following is a full, clear, and exact specification.

My invention relates to safety treads and more particularly to tiles and terrazzo adapted for use on stairs, platforms and wherever there is danger of accident due to slipping thereon.

It has heretofore been proposed to make a safety tread of a conglomerate of crystalline alumina grains bonded by ceramic materials. Under certain traffic conditions there is a tendency for a safety tread tile made of such extremely hard and durable material to show ultimately some decrease in anti-slipping characteristics. This is thought to be due in part to the tile pores loading with foreign matter and to the grains being so hard and so firmly bonded in place that the slight abrasions and shocks to which they are subjected serve merely to glaze or wear the grains to a smooth surface and do not disrupt the bond. In such cases, it is desirable to employ a brittle and softer granulated material which will be abraded by the traffic to an appreciable extent and with sufficient rapidity to prevent such glazing and loading actions. Also the difference in degree of hardness between the grains and the bond should be less pronounced for such treads so that the bond will be subjected to considerable wear and permit the tread surface to be renewed occasionally by the worn grains being dislodged and new sharp grains presented in their places. So long as the abrasive grains are harder and more wear-resisting than the bond, they will project above the bond and receive the major portion of the traffic wear, and if selected to have the right degree of hardness and brittleness compared with such qualities in the bond, the grains will be either broken or dislodged before they can acquire a smooth, glaze-like surface.

It therefore is one object of my invention to provide a safety tread which overcomes this objection, and to select therefor such an abrasive material and bonding ingredients that in accordance with the above principles, I may have a tread capable of renewing its safety characteristics under a normal usage for which it is adapted and remain always anti-slipping, even where the pedestrian traffic wear is light.

The principal object of my invention is to utilize materials which occur commonly in nature and which may be combined inexpensively and by a simple procedure into an anti-slipping tile capable of remaining anti-slipping and wear-resisting for a long period of time. Further objects will be apparent in the following disclosure.

In accordance with my invention, I propose to utilize quartz as the essential anti-slipping material and to bond it into a porous but integral structure by a ceramic bonding material which will permit the quartz grains to retain their abrasive edges and hold them in place under ordinary traffic abrasions, but allow them to be broken away ultimately in order that the quartz granules may not wear down to smooth surfaces but will become dislodged from the tread and permit fresh grains to be presented to the traffic wear.

The ceramic bonds which are best adapted for my purposes are the vitrifiable clay materials which may be fired at ordinary ceramic firing temperatures to a vitrified and preferably a vitreous condition. It is also within the scope of my invention to utilize the more refractory clay materials and to lower their fusion point by the addition of various fluxes, such as feldspar, fusible clays and so forth, to produce complex silicates having a glassy structure and the qualities of durability and tenacity for holding the quartz granules in place.

While various proportions of quartz and bond may be utilized, it is essential that the quartz form the body of the tile and receive substantially all the wear and that the bond be present merely in such an amount as to unite the quartz granules into an integral mass. It is preferable that the quartz form the major portion of the tile volume, where traffic wear is severe, but the relative amounts must be determined in part by the bond strength or hardness of the tile which is desired. As a specific example of a ceramic bonded tile containing crushed quartz granules or sand which has irregular surfaces and sharp projections, the following ingredients may be used in the proportions specified:

| | |
|---|---|
| Quartz grains | 55 parts by weight. |
| Feldspar | 22 " " " |
| Ball clay | 10 " " " |
| Slip clay | 13 " " " |

A mixture of these materials and water in suitable proportion is formed into the tile shape, dried and fired in a ceramic kiln in accordance with the usual practice in this art. The firing treatment may involve heating the ware at approximately cone 12 for several days and then slowly cooling the tile, whereby a vitreous bond is formed in the shape of thin walls or posts between the quartz granules, thus bonding them into an integral but porous mass.

The porosity of the tile and its safety characteristics may be regulated by selecting proper sizes of grain. I find it desirable to utilize coarse granules to form a rough surface and intersperse these with finer material which increases the tile strength and lowers its porosity. Since the quartz grains should have high abrasive characteristics, I preferably crush coarse quartz material to the desired size, or select such materials found in nature as have not been water-worn or lost their angularities of structure.

In the specific example given, the quartz granules are made up of 50% of grains which will just pass through a 30 mesh screen, 30% of 60 mesh and 20% of 120 mesh. The resultant tile will have an approximate porosity, as measured by water absorption, of 8 to 10% by volume. The absorption of the better grades of tile will fall between 5 and 20%.

Having thus described my invention, what I claim as new and desire to secure by Letters Patent is:

1. A non-slip tile comprising abrasive quartz granules and a ceramic bond uniting said grains into an integral, wear-resisting mass in which the grains form the major portion of the tread surface, said bond being more wearable than the quartz and capable of permitting renewal of the tread anti-slipping characteristics under a normal usage.

2. A non-slip tile comprising quartz grains of high abrasive characteristics and a vitrified clay bond uniting the grains into an integral, porous, wear-resisting mass in which the quartz is wear-resisting and forms the major portion of the tile volume and the bond is more wearable and capable of permitting quartz grains to project thereabove on the surface.

3. A safety tile capable of maintaining an anti-slipping surface comprising abrasive quartz grains bonded by a vitreous clay material into an integral mass having an absorption of 5 to 20%, the quartz forming the major portion of the tile volume and being adapted to resist the traffic wear on the tile.

4. A non-slip tile comprising coarse quartz grains interspersed with finer grains and a vitreous clay bond integrally uniting the grains into a porous mass, the water absorption of which is between 5 and 20% of the total volume.

5. A non-slip tile comprising crushed quartz granules containing a substantial portion of large granules interspersed with smaller ones and varying between 30 and 120 mesh in size united by a hard clay bond fired to a vitreous condition, said tile having an absorption of from 5 to 20% and in which the quartz granules constitute the major portion of its volume.

Signed at Worcester, Massachusetts, this 5th day of Nov. 1920.

MACDONALD C. BOOZE.